(12) United States Patent
Asti et al.

(10) Patent No.: US 9,822,790 B2
(45) Date of Patent: Nov. 21, 2017

(54) SEALING SYSTEMS FOR TURBOEXPANDERS FOR USE IN ORGANIC RANKINE CYCLES

(76) Inventors: Antonio Asti, Florence (IT); Giacomo Landi, Florence (IT); Dante Sabella, Florence (IT); Paolo Susini, Florence (IT); Mario Martini, Florence (IT)

( * ) Notice: Subject to any disclaimer, the term of this patent is extended or adjusted under 35 U.S.C. 154(b) by 1073 days.

(21) Appl. No.: 14/008,185

(22) PCT Filed: Mar. 29, 2012

(86) PCT No.: PCT/EP2012/055631
§ 371 (c)(1),
(2), (4) Date: Dec. 19, 2013

(87) PCT Pub. No.: WO2012/130935
PCT Pub. Date: Oct. 4, 2012

(65) Prior Publication Data
US 2014/0099184 A1   Apr. 10, 2014

(30) Foreign Application Priority Data

Mar. 29, 2011   (IT) .............................. CO2011A0013

(51) Int. Cl.
*F04D 29/10* (2006.01)
*F01K 17/04* (2006.01)
(Continued)

(52) U.S. Cl.
CPC ............ *F04D 29/102* (2013.01); *F01D 11/04* (2013.01); *F01D 11/06* (2013.01); *F01K 17/04* (2013.01); *F01K 25/10* (2013.01)

(58) Field of Classification Search
CPC .......... F01D 11/06; F01K 17/04; F01K 25/10; F04D 29/102
(Continued)

(56) References Cited

U.S. PATENT DOCUMENTS 4,219,202 A * 8/1980 Koch .................. F16J 15/3464
                                                        277/379
4,793,141 A   12/1988 Yanai et al.
(Continued)

FOREIGN PATENT DOCUMENTS

CN    101126449 A   2/2008
CN    101258330 A   9/2008
(Continued)

OTHER PUBLICATIONS

JP2004197672 English language machine translation.*
(Continued)

*Primary Examiner* — Mark Laurenzi
*Assistant Examiner* — Wesley Harris
(74) *Attorney, Agent, or Firm* — GE Global Patent Operation (57) ABSTRACT

Methods and systems for controlling infiltration of ambient air into, and exfiltration of process gas out of, an organic Rankine system. A system comprises a first sealing mechanism configured to seal at least one shaft against exfiltration of a process gas when the turbomachine is operating. The system further comprises a second sealing mechanism configured to seal the at least one shaft against infiltration of ambient air when the system is in a standstill mode. The system further comprises one or more pressure sensors configured to detect a pressure of gas within the system to monitor whether infiltration of ambient air has occurred and a system purge is needed.

18 Claims, 5 Drawing Sheets

(51) Int. Cl.
*F01D 11/06* (2006.01)
*F01D 11/04* (2006.01)
*F01K 25/10* (2006.01)

(58) Field of Classification Search
USPC .................................. 277/331, 433, 583
See application file for complete search history.

(56) References Cited

U.S. PATENT DOCUMENTS

| | | | | |
|---|---|---|---|---|
| 5,377,216 | A | * | 12/1994 | Nilsen ..................... F01D 11/04 277/411 |
| 5,412,977 | A | * | 5/1995 | Schmohl ................. F01D 11/06 277/318 |
| 6,918,252 | B2 | | 7/2005 | Zimron et al. |
| 7,419,164 | B2 | | 9/2008 | Awtar et al. |
| 8,056,336 | B2 | | 11/2011 | Arnold et al. |
| 2005/0053464 | A1 | | 3/2005 | Simeone et al. |
| 2005/0183421 | A1 | | 8/2005 | Vaynberg et al. |
| 2006/0112693 | A1 | * | 6/2006 | Sundel .................... F01K 15/00 60/670 |
| 2006/0242985 | A1 | | 11/2006 | Leck et al. |
| 2007/0147988 | A1 | | 6/2007 | Ito et al. |
| 2010/0199672 | A1 | * | 8/2010 | Bellows ................. F01K 9/006 60/660 |
| 2011/0100009 | A1 | * | 5/2011 | Lehar ..................... F01K 23/10 60/651 |

FOREIGN PATENT DOCUMENTS

| | | | |
|---|---|---|---|
| CN | 101575990 | A | 11/2009 |
| EP | 2246524 | A2 | 11/2010 |
| EP | 2025879 | A3 | 3/2011 |
| JP | 57163103 | A | 10/1982 |
| JP | 59028001 | A | 2/1984 |
| JP | 61187503 | A | 8/1986 |
| JP | 1073005 | A | 3/1998 |
| JP | 2004197672 | A * | 7/2004 |
| JP | 2005083375 | A | 3/2005 |
| JP | 2005518493 | A | 6/2005 |
| JP | 2007177887 | A | 7/2007 |
| JP | 2008531975 | A | 8/2008 |
| RU | 2200916 | C2 | 3/2003 |
| RU | 2302536 | C2 | 7/2007 |

OTHER PUBLICATIONS

Unofficial English translation of Office Action issued in connection with corresponding JP Application No. 2014-501618 dated Mar. 29, 2016.

Chinese Office Action issued in connection with corresponding CN Application No. 201280015824.5 dated Sep. 4, 2014.

Unofficial English Translation of Russian Office Action issued in connection with corresponding RU Application No. 2013143399 dated Jan. 12, 2016.

* cited by examiner

SEALING SYSTEMS FOR TURBOEXPANDERS FOR USE IN ORGANIC RANKINE CYCLES

CROSS-REFERENCE TO RELATED APPLICATIONS

This is a national stage application under 35 USC §371 (c) of prior filed, co-pending PCT Patent Application Serial Number PCT/EP2012/055631, filed on Mar. 29, 2012 which claims priority to I.T. Application Serial No CO2011A000013, filed Mar. 29, 2011, the disclosures of which are hereby incorporated in their entirety by reference herein.

TECHNICAL FIELD

The embodiments of the subject matter disclosed herein generally relate to power generation systems and more particularly to turboexpanders.

BACKGROUND OF THE INVENTION

Figure 1:
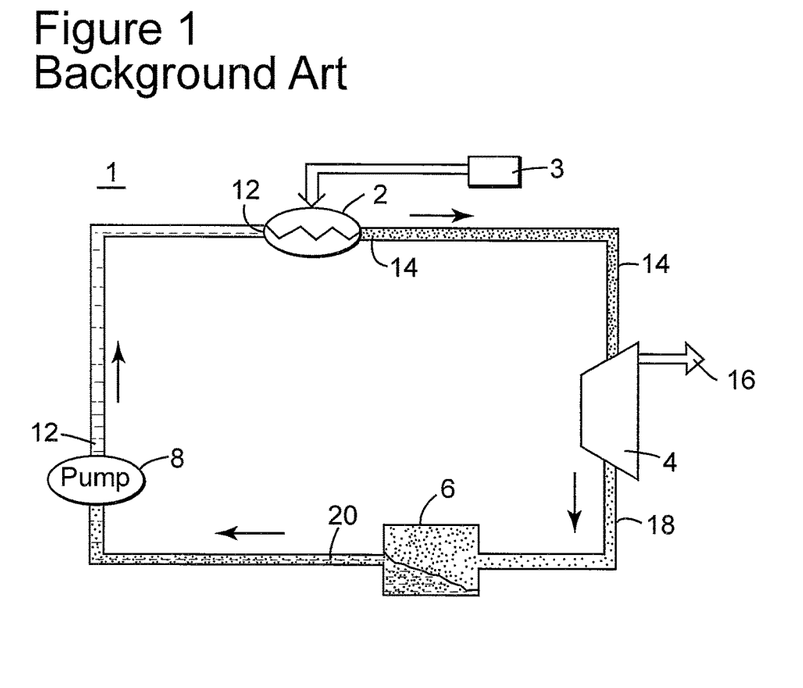
FIG. 1 depicts a Rankine cycle.

Rankine cycles use a working fluid in a closed-cycle to gather heat from a heating source or a hot reservoir and to generate a hot gaseous stream that expands through a turbine to generate power. The expanded stream is condensed in a condenser by transferring heat to a cold reservoir and pumped up to a heating pressure again to complete the cycle. Power generation systems such as gas turbines or reciprocating engines (primary system) produce hot exhaust gases that are either used in a subsequent power production process (by a secondary system) or are lost as waste heat to the ambient. For example, the exhaust of a large engine may be recovered in a waste heat recovery system used for production of additional power, thus improving the overall system efficiency. A common waste heat power generation system operating in a Rankine cycle is shown in FIG. 1.

The power generation system 1 includes a heat exchanger 2, also known as a boiler or evaporator, a turboexpander 4, a condenser 6 and a pump 8. In operation, beginning with the heat exchanger 2, an external heat source 10, e.g., hot flue gases, heats the heat exchanger 2. This causes the received pressurized liquid medium 12 to turn into a pressurized vapor 14, which flows to the turboexpander 4. The turboexpander 4 receives the pressurized vapor stream 14 and can generate power 16 as the pressurized vapor expands. The expanded lower pressure vapor stream 18 released by the turboexpander 4 enters the condenser 6, which condenses the expanded lower pressure vapor stream 18 into a lower pressure liquid stream 20. The lower pressure liquid stream 20 then enters the pump 8, which both generates the higher pressure liquid stream 12 and keeps the closed-loop system flowing. The higher pressure liquid stream 12 then flows in to the heat exchanger 2 to continue this process.

One working fluid that can be used in a Rankine cycle is an organic working fluid such as cyclopentane. An organic working fluid in this context is sometimes referred to as an organic Rankine cycle (ORC) fluid, and systems using ORC fluids are sometimes referred to as ORC systems. For safety reasons, it is undesirable to have cyclopentane interacting with ambient air.

Two types of leakage problems, for example, should be addressed in turboexpanders used in ORC systems. When the ORC systems are operating, the pressure inside the loop of FIG. 1 is relatively high as compared to the ambient environment, so it is desirable to contain the ORC fluid, e.g., cyclopentane from escaping (exfiltrating) the system. When the ORC systems are not operating, i.e., in standstill mode, then the pressure inside the loop of FIG. 1 is relatively low as compared to the ambient environment, so it is desirable to avoid the ambient air from infiltrating the ORC system.

Accordingly, systems and methods for more efficiently operating a power generation system are desirable.

SUMMARY OF THE INVENTION

Methods and systems for controlling infiltration of ambient air into, and exfiltration of process gas out of, e.g., an organic Rankine system are described. A first sealing mechanism, e.g., a double dry gas seal, can be used to prevent exfiltration of process gas when the organic Rankine system is operating. A second sealing mechanism, e.g., an inflatable static ring seal, can be used to prevent infiltration of ambient air when the organic Rankine system is at standstill. One or more pressure sensors can be provided in the organic Rankine system to determine whether, for example, infiltration of ambient air has occurred and a system purge is needed.

According to an embodiment of the present invention, a method for controlling infiltration and exfiltration of gases via a shaft of a turbomachine comprises sealing the shaft against exfiltration of a process gas when the system is operating, sealing the shaft against infiltration of ambient air when the turbomachine is in a standstill mode, and detecting a pressure of gas within the turbomachine to monitor whether infiltration has occurred.

According to an embodiment of the present invention, a system for power generation comprises a turbomachine having at least one shaft connected to a gearbox, a first sealing mechanism configured to seal the at least one shaft against exfiltration of a process gas when the system is operating, a second sealing mechanism configured to sealing the at least one shaft against infiltration of ambient air when the system is in a standstill mode, and at least one sensor configured to detect a pressure of gas within the system to monitor whether the infiltration has occurred.

According to an embodiment of the present invention, a power generation system comprises means for sealing a shaft of a turbomachine against exfiltration of a process gas when the system is operating, means for sealing the shaft against infiltration of ambient air when the system is in a standstill mode, and means for detecting a pressure of gas within the system to monitor whether the infiltration has occurred.

BRIEF DESCRIPTION OF THE DRAWINGS

The accompanying drawings illustrate exemplary embodiments of the present invention.

DETAILED DESCRIPTION OF THE INVENTION

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

As described in the Background, and shown in FIG. 1, a Rankine cycle can be used in power generation systems to capture a portion of the waste heat energy. To address the two essentially opposite sealing requirements described above, i.e., operating sealing requirements and standstill sealing requirements, exemplary embodiments provide for a composite sealing arrangement that seals the turboexpander 4 against both infiltrations of ambient air and exfiltrations of process gas. More specifically, to address potential exfiltration of the ORC fluid while the system is operating, exemplary embodiments employ a first sealing mechanism, e.g., a double dry gas seal. To address potential infiltration of ambient air while the system is at standstill, a second sealing mechanism can also be provided, e.g., an inflatable static seal ring. Note that although the first and second sealing mechanisms described herein are primarily adapted to mitigate exfiltration and infiltration, respectively, they will also provide some additional sealing protection against infiltration and exfiltration, respectively. Additionally, control sensors and feedback circuitry are used to control the system to adapt to respond to detected pressure levels within the system should the sealing mechanisms perform inadequately, e.g., to provide alerts and controls associated with ambient air infiltrations.

Note that although embodiments described herein refer to the use of sealing arrangements in a turboexpander that the present invention is not so limited. More specifically, sealing arrangements according to these embodiments can be employed in other turbomachines, e.g., compressors and the like.

An exemplary system 200 for power generation (in which some components of a conventional Rankine system have been removed for simplicity and brevity) in which such an exemplary turboexpander with sealing arrangements according to these embodiments will now be described with respect to FIG. 2. Initially, the system is pressurized and the working fluid is circulated (in the direction shown by the arrowheads) in the closed-loop Rankine cycle system by the pump 202. The working fluid, e.g., an ORC fluid, is pumped to the evaporator 204, where the working fluid is evaporated. This pressurized vapor then goes to the turboexpander 206 which, in this example, has a first expansion stage 208 and a second expansion stage 210, however the present invention is equally applicable to turboexpanders or other turbomachines having different configurations, e.g., having only a single stage or more than two stages.

The first expansion stage 208 includes an inlet guide vane 212 which regulates an amount/rate of pressurized vapor entering the first expansion stage 208. The pressurized vapor expends some energy during expansion and travels on to the second expansion stage 210, entering the second expansion stage 210 through another inlet guide vane 214 which also regulates an amount/rate of vapor entering the second expansion stage 210. As the vapor expands in the expansion stages 208 and 210, work is performed which rotates their respective shafts 216, 218 (e.g., via a respective wheel (not shown) which are connected to a gear box 220. A single shaft 222 connects the gear box 220 to a generator 224. Power 226 is then output from the generator 224.

Figure 2:
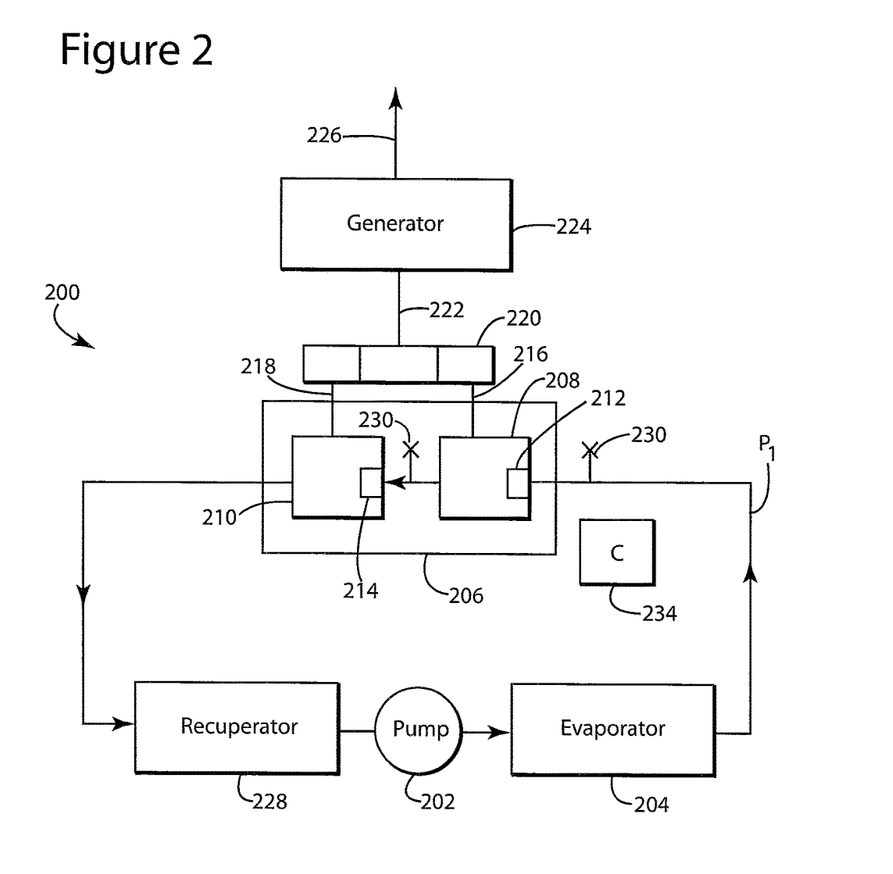
FIG. 2 illustrates an organic Rankine cycle according to exemplary embodiments of the present invention.

Returning to the Rankine cycle portion of FIG. 2, the expanded vapor leaves the second expansion stage 210 and exits the turboexpander 206 enroute to a recuperator 228 which allows for heat exchange of the working fluid. The working fluid then goes through other steps of the Rankine cycle (not shown) enroute to the pump 202 to repeat the cycle. Sensors 230 represent pressure monitoring sensors and controller 234 controls settings of the power generation system and provides alerts, both of which will be described in more detail below. Although two pressure sensors 230 are illustrated, more or fewer may be provided. According to one purely illustrative embodiment, pressure sensors or transducers 230 may also or alternatively be placed at substantially the locations indicated by the reference number 216 and 218 (also associated with the shafts).

Figure 3:
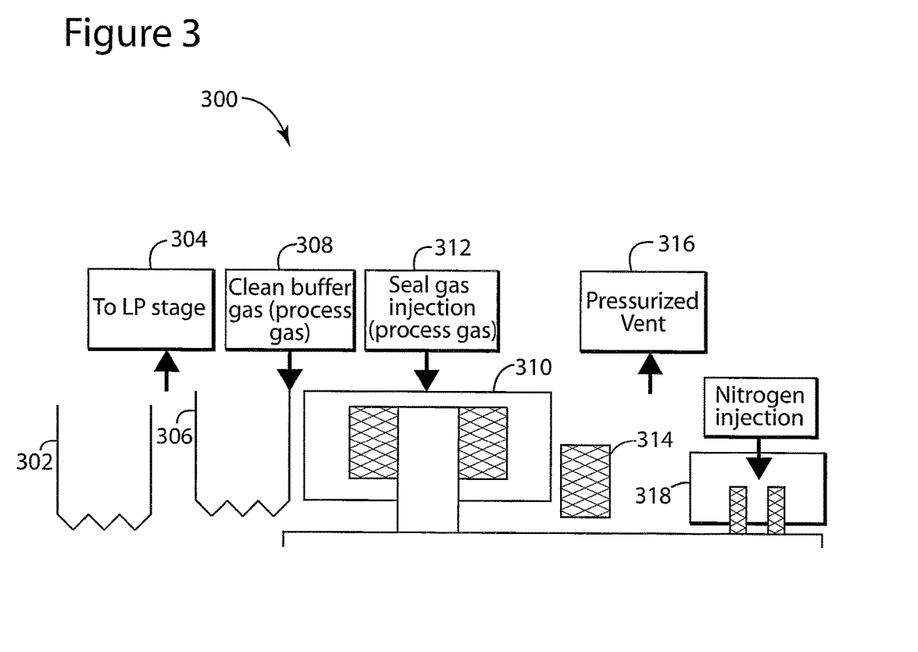
FIG. 3 shows a first sealing mechanism and a second sealing mechanism used to prevent exfiltration of process gas during operation and infiltration of ambient air during standstill, respectively, according to exemplary embodiments of the present invention.
Figure 4:
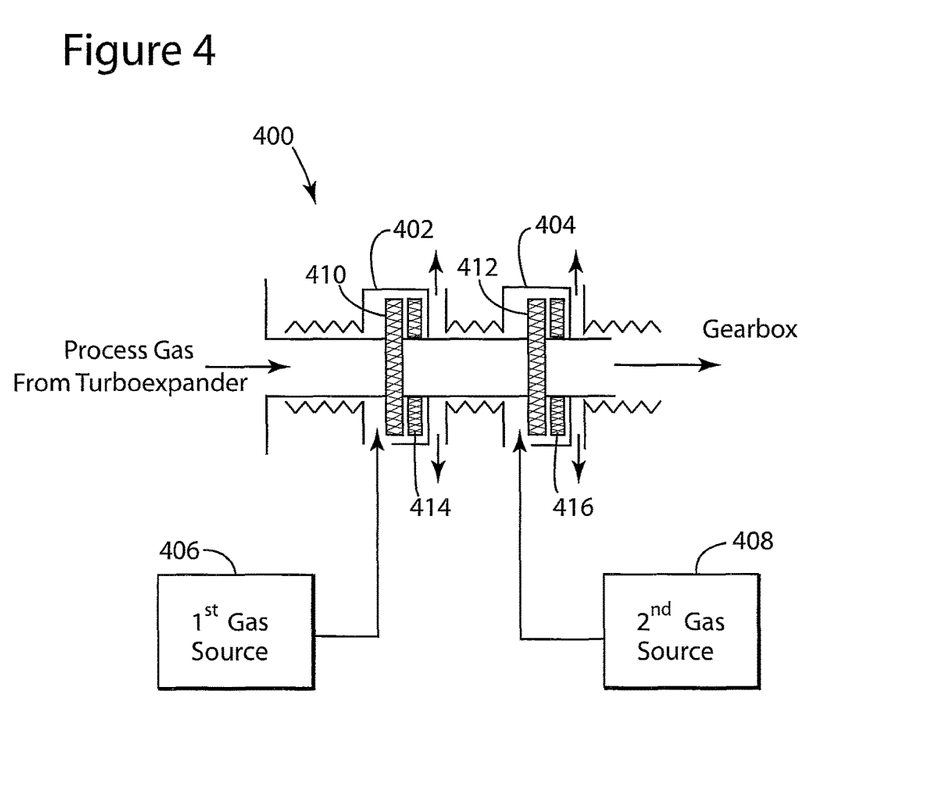
FIG. 4 depicts a double dry gas seal.

An exemplary sealing cartridge 300 for sealing, e.g., the shafts 216 and/or 218 in the turboexpander 206, according to an embodiment is illustrated in FIG. 3. Therein, the sealing cartridge includes a first process labyrinth seal 302 which is disposed upstream of a vent 304 to an LP stage of the system, and a second process labyrinth seal 306 upstream of an input port 308 which provides buffer gas to an outer side of a double dry gas seal 310. Double dry gas seal 310, also referred to herein as an example of a first sealing mechanism and which is described in more detail below with respect to FIG. 4, is disposed adjacent to the process labyrinth seal 306 in FIG. 3, and is supplied with a seal gas, e.g., the ORC process gas, via port 312. The sealing cartridge 300 also includes an inflatable, static seal ring 314 which is operable according to embodiments to seal the system when the system is at standstill and which is an example of a second sealing mechanism according to this embodiment. Moreover, the double dry gas seal 310 can operate as a backup to the inflatable static seal ring 314 with respect to infiltration of ambient air into the system at startup.

The inflatable, static seal ring 314 is, according to this exemplary embodiment, disposed between the double dry gas seal 310 and a pressurized vent 316 which vents to the atmosphere. According to one exemplary embodiment, a pressure sensor 230 can be disposed within the pressurized vent 230 to take measurements of the gas pressure within this portion of the sealing system which can be used as described below. A buffer seal 318 can also be included in the sealing cartridge 300.

As shown in FIG. 4, an exemplary tandem-type (also called a double) dry gas seal system 400 which can be used as a first sealing mechanism 310 includes a first seal 402 and a second seal 404, both contained in a single package. During normal operation of the system 200, the first seal 402 operates to contain the total pressure of gas processed, while the second seal 4044 acts as a back-up which is designed to operate only if the first seal 402 fails or leaks excessively. Generally a conditioned gas flow coming from a first gas source 406 is injected upstream of seal 402 to isolate the dry gas seal 400 from the process gas, e.g., cyclopentane. The second seal 404 in the tandem 400 may receive a lower pressure gas from source 408. Each seal 402, 404 typically includes a stationary disc 410, 412 and a mobile disc 414, 416, respectively.

According to embodiments, a control system 234 is also used in conjunction with the sealing arrangement 200. During prolonged shutdowns of the Rankine cycle plant or system 200, there is a risk that air will infiltrate the system due to the pressure differential between the ambient air and the vapor pressure of the ORC fluid, e.g., cyclopentane. To address this possibility, the control system according to one embodiment includes at least one o pressure transducer or sensor 230 which measure the gas pressure either (a) within the loop of the organic Rankine system, e.g., of FIG. 1, within the turboexpander, or both. If the detected gas pressure is above the expected vapor pressure of the ORC fluid, e.g., cyclopentane, then the control system concludes or indicates that air has infiltrated the system and signals that the system should be purged, e.g., to a user interface read by an operator. During operation of the system, the pressure measurements can, for example, be used to verify the dry gas seal integrity is maintained, i.e., should the change in pressure across the seal increase above a certain threshold, this probably means that the seal integrity has/is failing.

Figure 5:
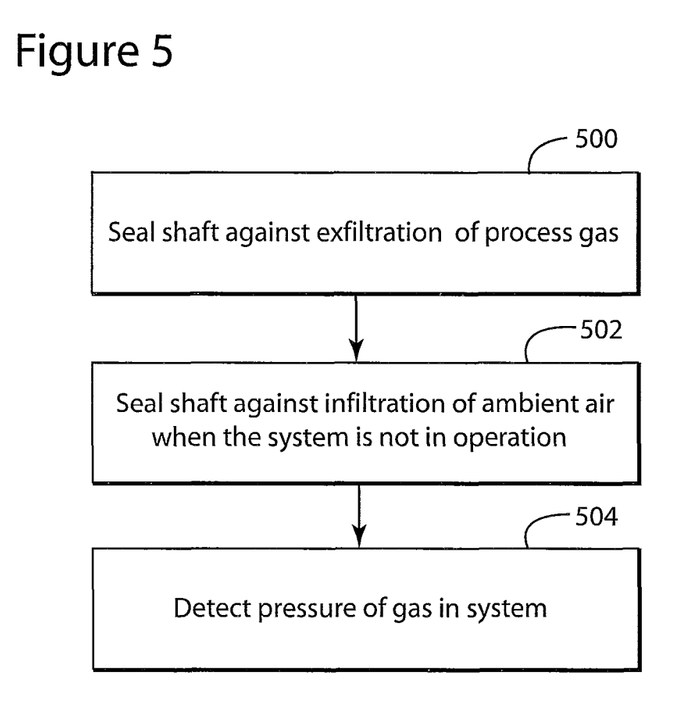
FIG. 5 is a flowchart depicting a method for controlling exfiltration of process gas and infiltration of ambient air according to exemplary embodiments of the present invention.

Thus, as illustrated in FIG. 5, a composite method for controlling infiltration and exfiltration of gases via a shaft of a turbomachine operating in a system, e.g., an organic Rankine cycle system, can include certain steps. Therein, at step 500, a shaft, e.g., of a turboexpander, is sealed against exfiltration of a process gas when the system is operating, e.g., via a double dry gas seal. At step 502, the shaft is also sealed against infiltration of ambient air when the system is in a standstill mode. Furthermore, as shown by step 504, the gas pressure within the system is detected to monitor whether infiltration has occurred.

Note that although the foregoing exemplary embodiments have focused on exemplary organic Rankine cycle systems, sealing systems and methods according to these embodiments are not limited to organic Rankine cycle systems. For example, but without limitation, such sealing systems and methods can also be applied or provided to liquefied natural gas (LNG) systems.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other example are intended to be within the scope of the claims if they have structural elements that do not differ from the literal language of the claims, or if they include equivalent structural elements within the literal languages of the claims.

What is claimed is:

1. A method for controlling infiltration and exfiltration of gases via a shaft of a turbomachine, the method comprising:
    sealing the shaft against exfiltration of a process gas when the turbomachine is operating using a double dry gas seal;
    sealing the shaft against infiltration of ambient air when the turbomachine is in a standstill mode using an inflatable static seal ring wherein the inflatable static seal ring is disposed between the double dry gas seal and a pressurized vent; and
    detecting a pressure of gas within the turbomachine to monitor whether the infiltration has occurred.

2. The method of claim 1, wherein the turbomachine is part of an organic Rankine cycle system.

3. The method of claim 2, wherein the detecting the pressure of the gas is also performed outside of the turbomachine within a loop of the organic Rankine cycle system.

4. The method of claim 2, further comprising:
    signaling for a purging operation of the organic Rankine cycle system to be performed if the detected pressure of the gas within the organic Rankine cycle system is above a predetermined threshold.

5. The method of claim 1, wherein the process gas is cyclopentane.

6. The method of claim 1, wherein the turbomachine is a turboexpander.

7. A system for power generation comprising:
    a gearbox;
    a turbomachine having at least one shaft connected to the gearbox;
    a first sealing mechanism configured to seal the at least one shaft against exfiltration of a process gas when the system is operating comprising a double dry gas seal;
    a second sealing mechanism configured to seal the at least one shaft against infiltration of ambient air when the system is in a standstill mode, wherein the second sealing mechanism comprises an inflatable static seal ring, wherein the inflatable static seal ring is disposed between the double dry gas seal and a pressurized vent; and
    at least one sensor configured to detect a pressure of gas within the system to monitor whether the infiltration has occurred.

8. The system of claim 7, wherein the at least one sensor is disposed within the turbomachine.

9. The system of claim 7, wherein the at least one sensor is disposed outside of the turbomachine within a loop of the system, wherein the system is an organic Rankine cycle system.

10. The system of claim 9, further comprising:
    a controller configured to receive measurements from the at least one sensor and configured to signal for a purging operation of the organic Rankine cycle system to be performed if the detected pressure of the gas within the organic Rankine cycle system is above a predetermined threshold.

11. The system of claim 7, wherein the process gas is cyclopentane.

12. The system of claim 7, wherein the turbomachine is a turboexpander.

13. The system of claim 7, further comprising:
    a condenser fluidly connected to an outlet side of the turboexpander and configured to receive and condense an expanded vapor stream into a liquid stream;

a pump fluidly connected to an outlet side of the condenser configured to receive the liquid stream, configured to pressurize the liquid stream and configured to circulate the liquid stream to the heat exchanger; and a heat exchanger fluidly connected to an outlet side of the pump and configured to receive the pressurized liquid stream and vaporize the pressurized liquid stream into a pressurized vapor stream.

14. A power generation system comprising:

a first shaft seal for sealing a shaft of a turbomachine against exfiltration of a process gas when the system is operating comprising a double dry gas seal;

a second shaft seal for sealing the shaft against infiltration of ambient air when the system is in a standstill mode, wherein the second shaft seal comprises an inflatable static seal ring, wherein the inflatable static seal ring is disposed between the double dry gas seal and a pressurized vent; and a detector for detecting a pressure of gas within the system to monitor whether the infiltration has occurred.

15. The power generation system of claim 14, wherein the detector for detecting the pressure of the gas is within the turbomachine.

16. The power generation system of claim 14, wherein the detector for detecting the pressure of the gas is outside of the turbomachine within a loop of the power generation system, wherein the power generation system is an organic Rankine cycle system.

17. The power generation system of claim 14, wherein the process gas is cyclopentane.

18. The power generation system of claim 14, wherein the turbomachine is a turboexpander.

* * * * *